(12) United States Patent
Pedlow, Jr. et al.

(10) Patent No.: US 7,773,750 B2
(45) Date of Patent: *Aug. 10, 2010

(54) SYSTEM AND METHOD FOR PARTIALLY ENCRYPTED MULTIMEDIA STREAM

(75) Inventors: Leo M. Pedlow, Jr., Ramona, CA (US); Henry Derovanessian, San Diego, CA (US); Brant Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/796,909

(22) Filed: Apr. 30, 2007

(65) Prior Publication Data

US 2007/0204146 A1 Aug. 30, 2007

Related U.S. Application Data

(63) Continuation of application No. 10/403,834, filed on Mar. 31, 2003, now Pat. No. 7,215,770, which is a continuation-in-part of application No. 10/038,217, filed on Jan. 2, 2002, now Pat. No. 7,336,787, and a continuation-in-part of application No. 10/038,032, filed on Jan. 2, 2002, now Pat. No. 7,139,398, and a continuation-in-part of application No. 10/037,914, filed on Jan. 2, 2002, now Pat. No. 7,124,303, and a continuation-in-part of application No. 10/037,499, filed on Jan. 2, 2002, now Pat. No. 7,151,831, and a continuation-in-part of application No. 10/037,498, filed on Jan. 2, 2002, now Pat. No. 7,127,619.

(60) Provisional application No. 60/429,011, filed on Nov. 22, 2002, provisional application No. 60/409,675, filed on Sep. 9, 2002, provisional application No. 60/372,870, filed on Apr. 16, 2002.

(51) Int. Cl.
*H04N 7/167* (2006.01)
(52) U.S. Cl. ...................... 380/212
(58) Field of Classification Search ................ 380/212, 380/210
See application file for complete search history.

(56) References Cited

U.S. PATENT DOCUMENTS 4,881,263 A 11/1989 Herbison et al.

(Continued)

FOREIGN PATENT DOCUMENTS

WO 200007817 11/2000

OTHER PUBLICATIONS

"Content Selection for Partial Encryption" U.S. Appl. No. 11/903,809.

(Continued)

*Primary Examiner*—Farid Homayounmehr
(74) *Attorney, Agent, or Firm*—John L. Rogitz

(57) ABSTRACT

A multimedia stream head end includes a legacy conditional access (CA) device that fully encrypts the stream using legacy keys. A copy of the stream is sent to a secondary CA device that encrypts only critical packets in the stream using secondary keys to render a partially encrypted stream. The critical packets in the fully encrypted stream from the legacy CA device are obtained and inserted next to the corresponding critical packets in the partially encrypted stream. Thus, only critical packets are encrypted, with encrypted versions being generated by both the legacy CA and secondary CA without the legacy CA knowing which of the packets that it encrypts are "critical".

17 Claims, 1 Drawing Sheet

U.S. PATENT DOCUMENTS

| | | |
|---|---|---|
| 5,151,782 A | 9/1992 | Ferraro |
| 5,414,852 A | 5/1995 | Kramer et al. |
| 5,477,263 A | 12/1995 | O'Callaghan et al. |
| 5,526,427 A | 6/1996 | Thomas et al. |
| 5,600,378 A | 2/1997 | Wasilewski |
| 5,629,866 A | 5/1997 | Carrubba et al. |
| 5,652,615 A | 7/1997 | Bryant et al. |
| 5,696,906 A | 12/1997 | Peters et al. |
| 5,726,702 A | 3/1998 | Hamaguchi et al. |
| 5,761,180 A | 6/1998 | Murabayashi et al. |
| 5,838,873 A | 11/1998 | Blatter et al. |
| 5,917,830 A | 6/1999 | Chen et al. |
| 5,943,605 A | 8/1999 | Koepele, Jr. |
| 5,973,726 A | 10/1999 | Iijima et al. |
| 6,005,940 A | 12/1999 | Kulinets |
| 6,057,832 A | 5/2000 | Lev et al. |
| 6,134,237 A | 10/2000 | Brailean et al. |
| 6,170,075 B1 | 1/2001 | Schuster et al. |
| 6,201,927 B1 | 3/2001 | Comer |
| 6,219,358 B1 | 4/2001 | Pinder et al. |
| 6,222,924 B1 | 4/2001 | Salomaki |
| 6,223,290 B1 | 4/2001 | Larsen et al. |
| 6,226,385 B1 | 5/2001 | Taguchi et al. |
| 6,314,111 B1 | 11/2001 | Nandikonda et al. |
| 6,327,421 B1 | 12/2001 | Tiwari et al. |
| 6,351,813 B1 | 2/2002 | Mooney et al. |
| 6,377,589 B1 | 4/2002 | Knight et al. |
| 6,418,169 B1 | 7/2002 | Datari |
| 6,424,717 B1 | 7/2002 | Pinder et al. |
| 6,452,923 B1 | 9/2002 | Gerszberg et al. |
| 6,453,116 B1 | 9/2002 | Ando et al. |
| 6,480,551 B1 | 11/2002 | Ohishi et al. |
| 6,490,728 B1 | 12/2002 | Kitazato et al. |
| 6,526,144 B2 | 2/2003 | Markandey et al. |
| 6,550,008 B1 | 4/2003 | Zhang et al. |
| 6,590,979 B1 | 7/2003 | Ryan |
| 6,621,866 B1 | 9/2003 | Florencio et al. |
| 6,640,305 B2 | 10/2003 | Kocher et al. |
| 6,697,489 B1 | 2/2004 | Candelore |
| 6,707,696 B1 | 3/2004 | Turner et al. |
| 6,775,394 B2 | 8/2004 | Yu |
| 6,788,882 B1 | 9/2004 | Geer et al. |
| 6,853,728 B1 | 2/2005 | Kahn et al. |
| 6,883,050 B1 | 4/2005 | Safadi |
| 6,925,180 B2 | 8/2005 | Iwamura |
| 6,988,238 B1 | 1/2006 | Kovacevic et al. |
| 7,039,802 B1 | 5/2006 | Eskicioglu et al. |
| 7,039,938 B2 | 5/2006 | Candelore |
| 7,055,166 B1 | 5/2006 | Logan et al. |
| 7,079,752 B1 | 7/2006 | Leyendecker |
| 7,089,579 B1 | 8/2006 | Mao et al. |
| 7,096,481 B1 | 8/2006 | Forecast et al. |
| 7,096,487 B1 | 8/2006 | Gordon et al. |
| 7,110,659 B2 | 9/2006 | Fujie et al. |
| 7,120,250 B2 | 10/2006 | Candelore |
| 7,124,303 B2 | 10/2006 | Candelore |
| 7,127,619 B2 | 10/2006 | Unger et al. |
| 7,139,398 B2 | 11/2006 | Candelore et al. |
| 7,146,007 B1 | 12/2006 | Maruo et al. |
| 7,151,831 B2 | 12/2006 | Candelore et al. |
| 7,151,833 B2 | 12/2006 | Candelore et al. |
| 7,155,012 B2 | 12/2006 | Candelore et al. |
| 7,158,185 B2 | 1/2007 | Gastaldi |
| 7,167,560 B2* | 1/2007 | Yu .................. 380/200 |
| 7,177,429 B2* | 2/2007 | Moskowitz et al. ......... 380/252 |
| 7,194,758 B1 | 3/2007 | Waki et al. |
| 7,221,706 B2 | 5/2007 | Zhao et al. |
| 7,242,773 B2* | 7/2007 | Candelore .................. 380/240 |
| 7,287,275 B2* | 10/2007 | Moskowitz .................. 726/13 |
| 7,292,692 B2 | 11/2007 | Bonan et al. |
| 7,336,785 B1 | 2/2008 | Lu et al. |
| 7,350,082 B2* | 3/2008 | Candelore et al. .......... 713/191 |
| 7,362,775 B1* | 4/2008 | Moskowitz .................. 370/468 |
| 7,391,866 B2 | 6/2008 | Fukami et al. |
| 7,508,454 B1 | 3/2009 | Vantalon et al. |
| 7,530,102 B2* | 5/2009 | Moskowitz .................. 726/13 |
| 2001/0013123 A1 | 8/2001 | Freeman et al. |
| 2002/0021805 A1 | 2/2002 | Schumann et al. |
| 2002/0044558 A1 | 4/2002 | Gobbi et al. |
| 2002/0056093 A1 | 5/2002 | Kunkel et al. |
| 2002/0066101 A1 | 5/2002 | Gordon et al. |
| 2002/0067436 A1 | 6/2002 | Shirahama et al. |
| 2002/0083438 A1* | 6/2002 | So et al. ...................... 725/31 |
| 2002/0100054 A1 | 7/2002 | Feinberg et al. |
| 2002/0144116 A1 | 10/2002 | Giobbi |
| 2002/0144260 A1 | 10/2002 | Devara |
| 2002/0157115 A1 | 10/2002 | Lu |
| 2002/0194589 A1 | 12/2002 | Cristofalo et al. |
| 2002/0194613 A1 | 12/2002 | Unger ........................ 725/118 |
| 2003/0021412 A1 | 1/2003 | Candelore et al. |
| 2003/0026423 A1 | 2/2003 | Unger et al. ................. 380/217 |
| 2003/0028879 A1 | 2/2003 | Gordon et al. |
| 2003/0034997 A1 | 2/2003 | McKain et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0123664 A1 | 7/2003 | Pedlow, Jr. et al. |
| 2003/0133570 A1 | 7/2003 | Candelore et al. |
| 2003/0152224 A1 | 8/2003 | Candelore et al. |
| 2003/0156718 A1 | 8/2003 | Candelore et al. ........... 380/211 |
| 2003/0159139 A1 | 8/2003 | Candelore et al. ............ 725/25 |
| 2003/0159140 A1 | 8/2003 | Candelore |
| 2003/0174837 A1 | 9/2003 | Candelore et al. ........... 380/210 |
| 2003/0174844 A1 | 9/2003 | Candelore |
| 2003/0188164 A1 | 10/2003 | Okimoto et al. |
| 2003/0190054 A1 | 10/2003 | Troyansky et al. |
| 2003/0222994 A1 | 12/2003 | Dawson |
| 2004/0042486 A1* | 3/2004 | Onno et al. .................. 370/466 |
| 2004/0047470 A1 | 3/2004 | Candelore |
| 2004/0049688 A1 | 3/2004 | Candelore et al. ........... 713/191 |
| 2004/0049690 A1 | 3/2004 | Candelore et al. |
| 2004/0064688 A1 | 4/2004 | Jacobs |
| 2004/0073917 A1 | 4/2004 | Pedlow, Jr. et al. |
| 2004/0086127 A1 | 5/2004 | Candelore |
| 2004/0088552 A1 | 5/2004 | Candelore |
| 2004/0088558 A1 | 5/2004 | Candelore |
| 2004/0136532 A1 | 7/2004 | Pinder et al. ................ 380/239 |
| 2004/0151314 A1 | 8/2004 | Candelore |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao ........................... 725/110 |
| 2004/0240668 A1 | 12/2004 | Bonan et al. ................ 380/200 |
| 2004/0247122 A1 | 12/2004 | Hobrock et al. |
| 2004/0261099 A1 | 12/2004 | Durden et al. |
| 2004/0264924 A1 | 12/2004 | Campisano et al. |
| 2005/0015816 A1 | 1/2005 | Christofalo et al. |
| 2005/0028193 A1 | 2/2005 | Candelore et al. ............. 725/32 |
| 2005/0036067 A1 | 2/2005 | Ryal et al. .................... 348/565 |
| 2005/0063541 A1 | 3/2005 | Candelore |
| 2005/0066357 A1 | 3/2005 | Ryal ............................ 725/35 |
| 2005/0094808 A1 | 5/2005 | Pedlow, Jr. .................. 380/200 |
| 2005/0094809 A1 | 5/2005 | Pedlow, Jr. .................. 380/200 |
| 2005/0097596 A1 | 5/2005 | Pedlow, Jr. .................... 725/31 |
| 2005/0097597 A1 | 5/2005 | Pedlow, Jr. et al. |
| 2005/0097598 A1 | 5/2005 | Pedlow, Jr. .................... 725/31 |
| 2005/0097614 A1 | 5/2005 | Pedlow, Jr. .................... 725/90 |
| 2005/0102702 A1 | 5/2005 | Candelore et al. ........... 725/100 |
| 2005/0129233 A1 | 6/2005 | Pedlow, Jr. .................. 380/239 |
| 2005/0141713 A1 | 6/2005 | Genevois |
| 2005/0169473 A1 | 8/2005 | Candelore .................... 380/239 |

| | | |
|---|---|---|
| 2005/0192904 A1 | 9/2005 | Candelore et al. |
| 2005/0198586 A1 | 9/2005 | Sekiguchi et al. |
| 2005/0207442 A1* | 9/2005 | Zoest et al. ............... 370/465 |
| 2005/0283797 A1 | 12/2005 | Eldering et al. |
| 2006/0115083 A1 | 6/2006 | Candelore et al. ........... 380/216 |
| 2006/0130119 A1 | 6/2006 | Candelore et al. |
| 2006/0130121 A1 | 6/2006 | Candelore et al. |
| 2006/0153379 A1 | 7/2006 | Candelore et al. ........... 380/216 |
| 2006/0168616 A1 | 7/2006 | Candelore |
| 2006/0174264 A1 | 8/2006 | Candelore |
| 2006/0262926 A1 | 11/2006 | Candelore et al. ........... 380/200 |
| 2006/0269060 A1 | 11/2006 | Candelore et al. ........... 380/239 |
| 2007/0071002 A1* | 3/2007 | Jepson et al. ............... 370/389 |
| 2007/0098166 A1 | 5/2007 | Candelore |
| 2007/0160210 A1 | 7/2007 | Candelore et al. |
| 2007/0189710 A1 | 8/2007 | Pedlow |
| 2007/0208668 A1 | 9/2007 | Candelore |
| 2007/0269046 A1 | 11/2007 | Candelore et al. |
| 2007/0291940 A1 | 12/2007 | Candelore et al. |
| 2007/0291942 A1 | 12/2007 | Candelore et al. |
| 2008/0095364 A1 | 4/2008 | Candelore et al. |
| 2008/0107265 A1 | 5/2008 | Bonan et al. |
| 2008/0123845 A1 | 5/2008 | Candelore et al. |
| 2008/0123846 A1 | 5/2008 | Candelore et al. |
| 2008/0137847 A1 | 6/2008 | Candelore et al. |
| 2008/0159531 A1 | 7/2008 | Candelore et al. |
| 2008/0267400 A1 | 10/2008 | Unger et al. |
| 2009/0022165 A1 | 1/2009 | Candelore et al. |
| 2009/0080653 A1 | 3/2009 | Candelore et al. |
| 2009/0210346 A1 | 8/2009 | Candelore |
| 2009/0210698 A1 | 8/2009 | Candelore |

OTHER PUBLICATIONS

"Multiple Partial Encryption" U.S. Appl. No. 11/983,296.
"Partial Encryption" U.S. Appl. No. 12/001,561.
"Content Scrambling With Minimal Impact on Legacy Devices", U.S. Appl. No. 11/982,752.
"Decryption System" U.S. Appl. No. 11/891,209.
"MPEG-2 Transmission", http://www.erg.abdn.ac.uk/research/future-net/digital-video/mpeg2-trans.html.
U.S. Appl. No. 11/713,859 titled: "Receiver Device for Star Pattern Partial Encryption".
U.S. Appl. No. 11/708,417 titled: "Scene Change Detection".
U.S. Appl. No. 11/708,418 titled: "Selective Encryption Encoding".
U.S. Appl. No. 11/891,209 titled: "Decryption System".
Microsoft Windows XP, Oct. 2001, Microsoft, Screen Shots and Help Files.
MPEG-2 Digital Broadcast Pocket Guide vol. 6, Copyright 201 Acterna, LLC.
David Cutts, "DVB Conditional Access", Electronics and Communication Engineering Journal, Feb. 1997.
J.P. Van Gassel, D.P. Kelly, O. Eerenberg, and P.H.N. De With, "mPEG-2 Compliant Trick Play Over a Digital Interface", IEEE, 2002, pp. 170-171.

* cited by examiner

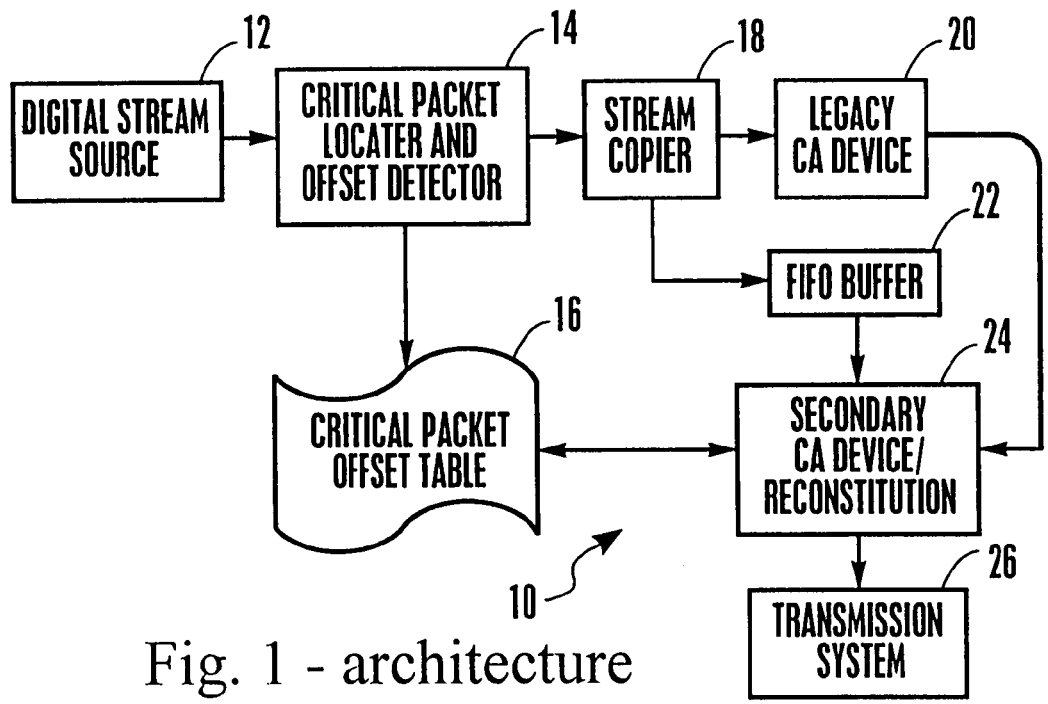
Fig. 1 - architecture
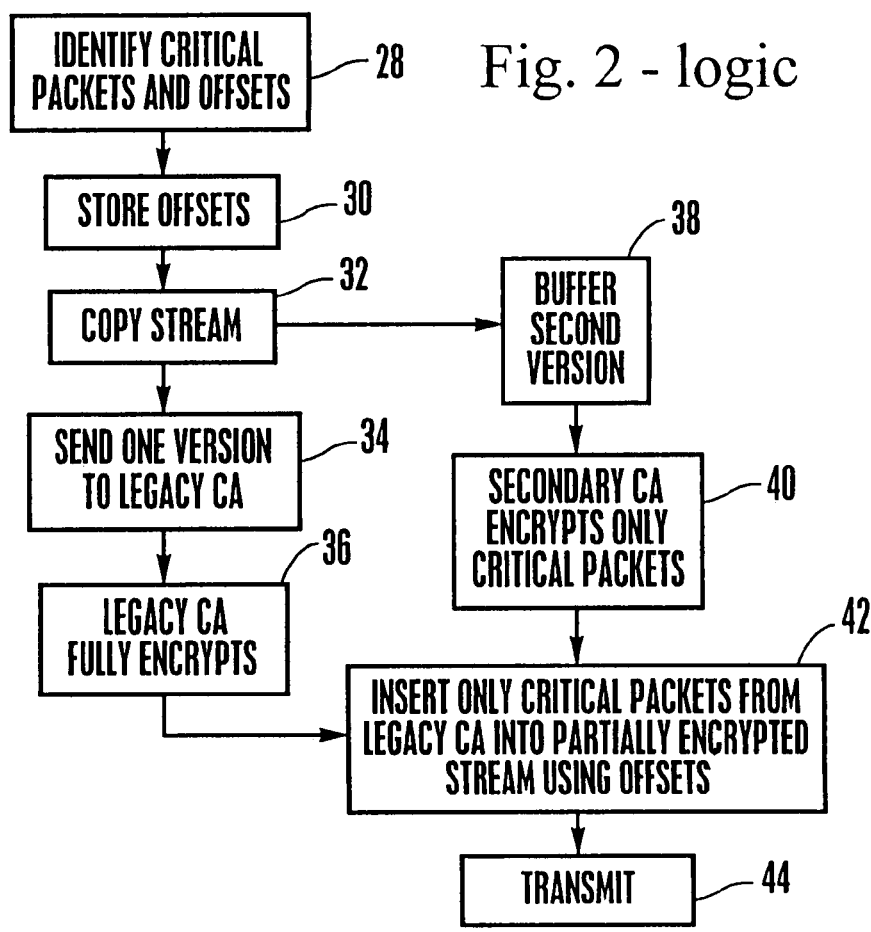
Fig. 2 - logic

SYSTEM AND METHOD FOR PARTIALLY ENCRYPTED MULTIMEDIA STREAM

RELATED APPLICATIONS

This application is a continuation of U.S. patent application Ser. No. 10/403,834, filed Mar. 31, 2003, now U.S. Pat. No. 7,215,770 which is a continuation-in-part of patent application entitled "Critical Packet Partial Encryption" to Unger et al., Ser. No. 10/038,217 now U.S. Pat. No. 7,336,787; patent application entitled "Time Division Partial Encryption" to Candelore et al., Ser. No. 10/038,032 now U.S. Pat. No. 7,139,398; entitled "Elementary Stream Partial Encryption" to Candelore, Ser. No. 10/037,914 now U.S. Pat. No. 7,124,303; entitled "Partial Encryption and PID Mapping" to Unger et al., Ser. No. 10/037,499 now U.S. Pat. No. 7,151,831; and entitled "Decoding and Decrypting of Partially Encrypted Information" to Unger et al., Ser. No. 10/037,498 now U.S. Pat. No. 7,127,619 all of which were filed on Jan. 2, 2002 and are hereby incorporated by reference herein; one or more of these parent applications are related to and claims priority benefit of U.S. Provisional patent application Ser. No. 60/429,011, filed Nov. 22, 2002, entitled "Critical Packet Selection in an Encrypted Transport Stream Through Referenced Offset", to Pedlow; and to U.S. Provisional patent application Ser. No. 60/409,675, filed Sep. 9, 2002, entitled "Generic PID Remapping for Content Replacement", to Candelore; and to U.S. Provisional patent application Ser. No. 60/372,870 filed Apr. 16, 2002, entitled "Generic PID Remapping for Content Replacement Applications", to Candelore. This application is also related to U.S. patent application Ser. No. 10/273,905, filed Oct. 18, 2002 to Candelore et al., entitled "Video Slice and Active Region Based Dual Partial Encryption"; and to Ser. No. 10/273,903, filed Oct. 18, 2002 to Candelore et al., entitled "Star Pattern Partial Encryption"; Ser. No. 10/274,084, filed Oct. 18, 2002 to Candelore et al., entitled "Slice Mask and Moat Pattern Partial Encryption"; Ser. No. 10/274,019, filed Oct. 18, 2002 to Candelore et al., entitled "Video Scene Change Detection". Each of the above applications are hereby incorporated by reference herein.

FIELD OF THE INVENTION

The present invention relates generally to encrypted multimedia streams.

BACKGROUND OF THE INVENTION

Multimedia streams that are sought to be protected (e.g., pay-per-view sporting events, movies, and the like) can be encrypted at the transmitter (colloquially referred to as the "head end") with keys in a way that receiving television set-top boxes (STBs) that have complementary keys can decrypt the content for viewing. Accordingly, cable service providers must use head end conditional access (CA) devices that encrypt multimedia streams in accordance with the capabilities of the set-top boxes of the viewers. Many of these capabilities, including decryption capabilities, are proprietary to the makers of the set-top boxes.

It happens that only a very few "incumbent" companies sell most of the set-top boxes. Accordingly, competitors seeking to enter the cable television set-top box market must license the proprietary keys from the incumbents, often at high prices. This reduces competition.

A straightforward alternative way to permit competitive STB makers to enter the market without paying licensing fees to the incumbents would be to encourage the cable service providers, at their head ends, to completely encrypt each stream with as many CA devices (using respective sets of keys) as there are set-top box providers. This, however, would plainly undesirably multiply the amount of bandwidth necessary to carry a program. Accordingly, Sony has developed an encryption scheme whereby only "critical" portions, such as I-frames or headers, of a stream are encrypted, with the remainder of the stream being sent in the clear but being useless without being able to decrypt the "critical" portions. In this way, only the critical portions need be duplicated in encrypted form, not the entire stream. With more specificity, only the critical portions are encrypted both by the existing ("legacy") CA devices using the incumbents' keys and by a secondary conditional access process using a competitor's keys. Published U.S. patent application Ser. No. 10/038,217, filed Jan. 2, 2002 and incorporated herein by reference, discloses such a scheme.

As understood herein, the legacy CA components that are made by the incumbent providers can be programmed by the incumbent providers to detect that the above-mentioned process is ongoing. Consequently, the legacy components might be programmed by the incumbents to defeat the process and, thus, to maintain a de facto monopoly. Having recognized this possibility, the solution below is provided.

SUMMARY OF THE INVENTION

A method for multimedia transmission includes generating a copy of a multimedia stream to render first and second clear streams having identical predetermined portions. The method also includes sending the first clear stream to a first conditional access (CA) component, which can be a legacy component provided by an incumbent, to encrypt the entire first clear stream to render a completely encrypted stream without the legacy component knowing about the second clear stream. Encrypted versions of the predetermined portions are obtained from the completely encrypted stream. The second clear stream is used to encrypt the predetermined portions using a second CA component to render a partially encrypted stream. The method then contemplates inserting the encrypted predetermined portions obtained from the completely encrypted stream into the partially encrypted stream for transmission thereof.

In a preferred embodiment, the partially encrypted stream with two encrypted versions of each critical packet is sent to plural set-top boxes over cable. Or, the partially encrypted stream can be wirelessly broadcast to plural receivers.

Preferably, the method includes determining locations of the predetermined portions using corresponding offsets from at least one packet identifier (PID). The offsets can be in integral numbers of packets from at least one PID. In a preferred embodiment, the offsets are used for identifying the locations of the encrypted predetermined portions in the completely encrypted stream for obtaining them and inserting them into the partially encrypted stream, e.g., adjacent to the predetermined portions that were generated by the second CA component.

In another aspect, a system for dual partial encryption of a digital data stream includes means for copying the stream to render first and second streams, and first conditional access (CA) means for encrypting only critical portions of the first stream to render a partially encrypted stream. Legacy CA means encrypt the entire second stream to render a substantially fully encrypted stream. Means are provided for combining only critical portions from the fully encrypted stream with the partially encrypted stream.

In still another aspect, a system for use in a digital stream transmitter head end having a legacy conditional access (CA) device includes a system CA device that encrypts at least predetermined portions, and preferably only the predetermined portions, of a first version of a stream. A reconstitution component combines, into a stream such as the first version of the stream, the predetermined portions from the system CA device with the predetermined portions obtained from a full encryption of a second version of the stream generated by the legacy CA device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is an architectural block diagram; and
FIG. 2 is a flow chart of the present logic.

DETAILED DESCRIPTION OF THE PREFERRED EMBODIMENT

Referring initially to FIG. 1, a system is shown, generally designated 10, that includes a source 12 of digital data streams, such as multimedia streams. The streams are sent to a critical packet locator and offset detector 14 which determines which packets in the stream are "critical". The critical packet locator and offset detector 14 also determines the offset (in integer numbers of packets from one or more packet identifiers (PID)) of each critical packet from a reference packet, e.g., the start of frame packet. The above-referenced patent application discusses critical packet selection. For clarity and completeness, critical packets may be information frames ("I-frames") in MPEG streams, or packetized elementary stream (PES) headers, or "action zones" of video, or other key packets that contain information which is essential to the successful recovery of picture and/or audio data. Preferably, packets containing references to program clock references (PCR) in the picture data (including presentation timestamp (PTS) and decoding timestamp (DTS) information) are never designated as "critical" packets.

As shown in FIG. 1, the offsets of the critical packets are stored in a critical packet offset table 16 or other data structure. Also, the stream is sent from the locator 14 to a stream copier 18 that makes a copy of the data stream. It is to be understood that the stream could be copied before critical packets and their offsets are identified.

As can be appreciated in reference to FIG. 1, one version of the stream is sent to a legacy conditional access (CA) device 20. The legacy CA device 20 can be considered to be a device provided by an incumbent that can process the stream by, e.g., encoding the stream with encryption keys, in accordance with the incumbent's proprietary CA scheme. The legacy CA device 20 completely encrypts the stream in accordance with conventional incumbent CA principles to render a fully encrypted stream.

Additionally, a version of the stream is sent from the stream copier to a buffer, preferably a circular first in first out (FIFO) buffer 22. The length of the buffer 22 should be of sufficient length (potentially a fixed length) to account for the delay caused by the processing time of the legacy CA device 20 in accordance with principles discussed below. The length of the FIFO buffer 22 may be established in increments of frame/picture or sequence/GOP for management purposes.

FIG. 1 shows that a secondary CA and reconstitution device 24 receives the clear stream from the FIFO buffer and the fully encrypted stream from the legacy CA device 20. The secondary CA and reconstitution device 24 includes a CA component, which encrypts only the critical packets in the clear stream received from the buffer 22, leaving the remaining portions of the stream unencrypted to render a partially encrypted stream. The secondary CA device 24 uses encryption keys that are different from those used by the legacy CA device 20. If desired, the pass through the secondary CA device 24 may slave to a new PCR value output by the legacy CA device 20, with the resulting corresponding value generated by the secondary CA device 24 differing by a fixed offset.

Also, the secondary CA and reconstitution device 24 includes a reconstitution component, which copies or strips or otherwise obtains only the now-encrypted critical packets from the fully encrypted stream received from the legacy CA device 20 and inserts the packets into the partially encrypted stream in accordance with principles below. The partially encrypted stream, now with two encrypted versions of each critical packet (one generated by the legacy CA device 20 and one generated by the secondary CA device 24) can be transmitted by a transmission system 26 over, e.g., cable, or terrestrial broadcast, or satellite broadcast.

It is to be understood that the functions of the secondary CA and reconstitution device 24 can be undertaken by separate components. It is to be further understood that the functions of the components 16, 18, 22, and 24 can be executed by a single secondary CA computing device or system or by separate devices/systems, and that the principles set forth herein apply to an overall system 10 that can have plural secondary CA systems.

The logic that is implemented by the system 10 shown in FIG. 1 can be seen in FIG. 2. Commencing at block 28, critical packets in the stream are identified, along with their offsets from a predetermined packet or packets, in accordance with principles set forth above. The offsets are stored (e.g., in the offset table 16) at block 30, and the stream is copied at block 32 by the stream copier 18.

A first clear version of the stream is sent to the legacy CA device 20 at block 34. At block 36, the legacy CA device 20 fully encrypts the stream in accordance with incumbent CA principles. In parallel, a second clear version of the stream is buffered at block 38 and then partially encrypted at block 40 by the secondary CA device 24. As mentioned above, the secondary CA device 24 encrypts only the critical packets.

Block 42 represents the reconstitution function. The encrypted critical packets from the legacy CA device 20 are obtained by accessing the critical packet offset table 16, obtaining the offsets, and counting through the fully encrypted stream using the offsets from the reference PID or PIDs. At each indicated critical packet offset location, the encrypted packet at that location is obtained by, e.g., copying the packet from the stream. The critical packets are then inserted into the partially encrypted stream immediately next to the corresponding preexisting critical packets in the stream that were generated by the secondary CA device 24. The partially encrypted stream with two encrypted versions of each critical packet, one from the legacy CA device 20 and one from the secondary CA device 24, is transmitted at block 44.

While the particular SYSTEM AND METHOD FOR PARTIALLY ENCRYPTED MULTIMEDIA STREAM as herein shown and described in detail is fully capable of attaining the above-described objects of the invention, it is to be understood that it is the presently preferred embodiment of the present invention and is thus representative of the subject matter which is broadly contemplated by the present invention. For example, in a less elegant solution, the secondary CA device 24 could completely encrypt the stream, and the critical packets from the fully encrypted versions from the legacy and secondary CA devices could be copied and inserted into a third clear version of the stream from which the unencrypted critical packets have been removed. The scope of the present invention thus fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method for multimedia transmission, comprising:
   generating at least two copies of a multimedia stream to render first and second clear stream copies;
   sending the first clear stream copy to a first conditional access (CA) component to encrypt the entire first clear stream copy to render a first completely encrypted stream;
   sending the second clear stream copy to a second conditional access (CA) component to encrypt the entire second clear stream copy to render a second completely encrypted stream;
   identifying predetermined portions of the multimedia stream, the predetermined portions being a subset of portions of the multimedia stream and having respective encrypted versions in the first completely encrypted stream and in the second completely encrypted stream;
   obtaining the encrypted versions of the predetermined portions from the first completely encrypted stream;
   obtaining encrypted versions of the predetermined portions from the second completely encrypted stream;
   substituting the encrypted predetermined portions obtained from both the first and second completely encrypted streams for the predetermined portions in the multimedia stream or in a duplicate clear copy thereof to render a transmission stream that is only partially encrypted for transmission thereof.

2. The method of claim 1, comprising transmitting the transmission stream to plural set-top boxes over cable.

3. The method of claim 1, comprising wirelessly broadcasting the transmission stream to plural receivers.

4. The method of claim 1, wherein the first CA component is a legacy component provided by an incumbent.

5. The method of claim 1, comprising determining locations of the predetermined portions at least in one of the streams using corresponding offsets from at least one packet identifier (PID).

6. The method of claim 5, wherein the offsets are in integral numbers of packets from at least one PID.

7. The method of claim 5, wherein the offsets are used for identifying the locations of the encrypted predetermined portions in the completely encrypted streams for obtaining them and inserting them into the multimedia stream to render the transmission stream.

8. The method of claim 1, wherein the encrypted predetermined portions obtained from the first completely encrypted stream are inserted adjacent to the predetermined portions encrypted using the second CA component to render the transmission stream.

9. A system for use in a digital stream transmitter head end having a legacy Conditional access (CA) device completely encrypting a multimedia Stream to render a legacy-encrypted stream, comprising:
   at least a system CA device completely encrypting a copy of the multimedia stream to render a system-encrypted stream; and
   a reconstitution component combining, into the multimedia stream, only predetermined portions from the system-encrypted stream and the same predetermined portions from the legacy-encrypted stream to render a partially encrypted stream having both a first encrypted version of the predetermined portions and a second encrypted version of the predetermined portions and having substantially no other encrypted data therein.

10. The system of claim 9, wherein the predetermined portions obtained from the legacy-encrypted stream represent the same information as the predetermined portions from the system-encrypted stream.

11. The system of claim 10, wherein the head end transmits the partially encrypted stream over cable.

12. The system of claim 10, wherein the head end wireless broadcasts the partially encrypted stream.

13. The system of claim 10, comprising at least one critical packet locator determining offsets of at least some predetermined portions from at least one packet identifier (PID).

14. The system of claim 13, wherein the offsets are in integral numbers of packets from at least one PID.

15. The system of claim 13, wherein the reconstitution component uses the offsets to insert the predetermined portions obtained from the encrypted streams adjacent to each other.

16. The system of claim 9, further comprising at least one buffer temporarily holding the system-encrypted stream.

17. The system of claim 13, further comprising at least one data structure storing the offsets.

* * * * *